Nov. 26, 1957 A. H. B. WALKER 2,814,709

MANUFACTURE OF DRY RECTIFIERS

Filed Aug. 3, 1955

INVENTOR

ALEC HERVEY BENNETT WALKER

ATTORNEYS

United States Patent Office 2,814,709

Patented Nov. 26, 1957

2,814,709

MANUFACTURE OF DRY RECTIFIERS

Alec Hervey Bennett Walker, King's Cross, London, England, assignor to Westinghouse Brake & Signal Company Limited, London, England Application August 3, 1955, Serial No. 526,168

Claims priority, application Great Britain September 13, 1954

2 Claims. (Cl. 219—19)

Figure 1:
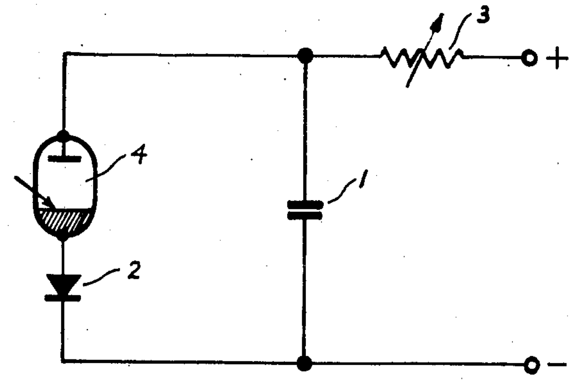

This invention relates to methods of removing short circuits from dry contact rectifier elements having a base plate, semi-conductor layer and counter-electrode, the short circuits being formed by trails of counter electrode material.

The invention is particularly useful in methods of manufacturing dry contact rectifiers in which the rectifier elements are punched from a large sheet consisting of a base plate upon which the semi-conductor layer and counter-electrode have previously been formed. This process of punching has the disadvantage that it draws the counter-electrode material across the edge of the element, producing thin trails which bridge the gap between the counter-electrode and the base plate at a number of places around the circumference of the element.

The invention may also be useful where the elements are cut from a large sheet by a process other than punching, for instance, by sawing or milling or where elements have been damaged.

It has previously been proposed to remove these short circuits by mechanical scraping but the process is inconvenient especially when the elements are of non-circular shape.

The purpose of the invention is to provide an efficient electrical method for removing these short circuits. Such an electrical method involves the burning out of the short circuits and it depends for its success upon producing sufficiently large currents in the short circuits without arcing or causing any mechanical or electrical damage to the elements.

According to the invention, a train of short pulses of heavy current is passed through a rectifier element in the forward direction for the purpose of vaporising completely the trails of counter electrode material which bridge the gap between the counter electrode and the base plate.

It might be thought that the process could be satisfactorily carried out by passing a continuous heavy direct current through the element in the reverse direction so that the high reverse resistance of the element causes current to be concentrated in the short circuits. It has been found, however, that to produce a sufficiently heavy current in the short circuits, such a high voltage is necessary that a considerable reverse current flows in the rectifier itself. The severe heating which results, besides having undesirable effects upon the rectifier itself, appears to cause oxidation of the trails of counter-electrode material in the regions of their points of contact with the base plate. Consequently, the resistance of the short circuits is greatly increased and the element behaves as if the short circuits had been removed. Usually, however, this improvement is only temporary and, on cooling down, the element again exhibits the symptoms of short circuits. A further undesirable feature is that the high voltage is liable to cause an arc to persist at a point where a trail of counter-electrode material has been burnt off, causing permanent and severe damage to the edge of the element.

Passing a continuous heavy direct current through an element in the forward direction also gives rise to excessive heating. This heating, as explained above, causes an increase in the resistance of the short circuits and the resulting high resistance, coupled with the low forward resistance of the rectifier, causes the rectifier to pass an unduly large portion of the total current and the clearance of the short circuits to be unsatisfactory.

Passing a heavy current for a short interval of time through an element in the reverse direction is also unsatisfactory for the following reason. As, in general, a single pulse of current burns out a single short circuit, and as the number of short circuits to be removed varies from element to element, pulsing must be repeated until all short circuits are removed. Should, however, pulsing be continued beyond that point the high voltage developed across the rectifier itself is usually sufficient to puncture the barrier layer and a damaging arc may also result at the clearing of the last short circuit.

The number of short circuits to be removed depends greatly upon the condition of the punching or cutting equipment used in manufacturing the element and upon the mechanical characteristics of the counter electrode material. With rectifier elements of from one to four square centimeters area punched with normal accuracy and with the normal type of counter-electrode material such, for instance, as an alloy of 40% cadmium and 60% tin, the number of short circuits usually lies between zero and five. With punching of low quality but within acceptable limits the number may rise to ten.

Since, in general, one short circuit is destroyed by each pulse, a train of ten pulses is normally sufficient to remove all short circuits and if, in accordance with the invention, the pulses are passed in the forward direction the surplus pulses which are applied after the clearing of the last short circuit pass harmlessly through the low forward resistance of the rectifier.

The pulse repetition frequency has no effect on the efficiency of the method of the invention provided the on-off ratio is maintained sufficiently small to prevent undue heating. Since the pulse train contains only a small number of pulses, using a low instead of a high repetition frequency causes no significant increase in the time taken to complete the process. In putting the method into effect a pulse repetition frequency equal to the mains frequency may be used because switching at this frequency can readily be achieved by means of a synchronously operated ignition.

The pulse length must be sufficiently great to ensure that a trail of counter-electrode material is completely vaporised before the current ceases to flow: it usually lies between 15 and 75 micro-seconds and sometimes rises to 100 micro-seconds. After vaporisation of each short circuit the voltage across the element is prevented from attaining a value sufficiently high to maintain an arc by the non-linear low forward resistance of the rectifier which is in shunt with the discharge.

The amplitude of the pulse must be chosen in conjunction with the pulse length: the combined effect of amplitude and length must cause sufficient temperature rise to vaporise the short circuits. With elements of the kind described peak currents of the order of 50 to 75 amps. per centimeter length of perimeter have been found satisfactory. Excessive amplitude must be avoided because burning is then liable to occur at the contact surfaces between the rectifier and the conductors supplying the current.

Figure 2:
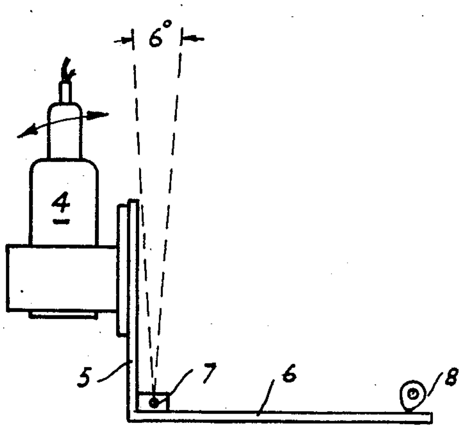

One process according to the invention will now be described, by way of example, with reference to the accompanying drawing, of which:

Figure 1 shows diagrammatically the circuit which supplies a train of current pulses of the rectifier element, and Figure 2 shows, diagrammatically also, one method of mounting the ignitron.

As shown in Figure 1, the circuit supplying pulses of current consists of a condenser connected in series with the rectifier element 2 being treated and a switching device 4. The condenser is continuously charged from a direct current source (not shown) through a resistance 3. The switching device is an ignitron 4 receiving ignition pulses from alternating current mains (not shown) and is arranged to produce a train of ten pulses at a repetition frequency equal to the frequency of the alternating current mains.

The ignitron 4 is controlled by a relaxation oscillator (not shown) incorporating a discharge tube synchronised with the alternating current mains, the oscillator providing ignition pulses for the ignitron 4 which in turn controls the circuit through the rectifier element. The number of pulses is controlled in known manner by a timing device (not shown) having a synchronous motor and co-operating contacts.

Unless precautions are taken the ignitron becomes erratic in its operation after a few hours, probably as a result of the ignitor being wetted by the mercury. This wetting appears to be due to the main discharge occurring repeatedly in the immediate vicinity of the ignitor, the rise in current at the beginning of the pulse being so sudden that the cathode spot is not able to migrate from the ignitor before the current reaches its peak value. This difficulty is avoided by means of the device shown diagrammatically in Figure 2, which rocks the ignitron through a small arc at a frequency of about eighty per minute. As shown in Figure 2, the ignitron 4 is mounted upon the vertical arm 5 of a bell-crank lever 5, 6 which is pivoted about a pivot 7. The distal end of the arm 6 is biassed upwards by the weight of the ignitron acting downwards to the left of the pivot, as shown in the drawing. This bias maintains the arm 6 in contact with a motor-driven cam 8 which is driven at about 80 R. P. M. and which is so proportioned as to cause the ignitron to rock through an angle of approximately 6°.

Having thus described my invention what I claim is:

1. A method of removing short circuits from dry contact rectifier elements having a base plate, a semi-conducting layer and a counter electrode, the short circuits being formed by thin trails of counter-electrode material which bridge the gap between the counter-electrode and the base plate in which a train of short pulses of heavy direct current is passed through the rectifier element in the forward direction only whereby the trails of counter-electrode material are completely vaporised.

2. A method of manufacturing dry contact rectifier elements which includes the step of removing short circuits between the counter electrodes and the base plate by passing through the element in the forward direction only a train of pulses of direct current, the pulse length not exceeding 100 micro-seconds and the peak current not exceeding 75 amperes per centimeter length of perimeter of the rectifier element.

References Cited in the file of this patent

UNITED STATES PATENTS

| | | |
|---|---|---|
| 1,886,682 | Hubbard | Nov. 8, 1932 |
| 2,070,435 | Katzman | Feb. 9, 1937 |
| 2,108,637 | Bartgis | Feb. 15, 1938 |
| 2,237,802 | Wittke | Apr. 8, 1941 |
| 2,279,187 | Thompson et al. | Apr. 7, 1942 |